United States Patent [19]

Ghoneim et al.

[11] Patent Number: 5,025,882
[45] Date of Patent: Jun. 25, 1991

[54] VEHICLE TRACTION CONTROL SYSTEM

[75] Inventors: Youssef A. Ghoneim, Mount Clemens; Yuen-Kwok Chin, Troy, both of Mich.

[73] Assignee: General Motors Corporation, Detroit, Mich.

[21] Appl. No.: 467,581

[22] Filed: Jan. 19, 1990

[51] Int. Cl.⁵ ............................................. B60K 31/00
[52] U.S. Cl. .................................... 180/197; 123/333; 364/426.01
[58] Field of Search .............................. 180/197, 76; 123/198 DB, 332, 333; 364/426

[56] References Cited

U.S. PATENT DOCUMENTS

| | | | |
|---|---|---|---|
| 4,637,487 | 1/1987 | Nakamura et al. | 180/197 |
| 4,682,667 | 7/1987 | Hosaka | 180/197 |
| 4,721,176 | 1/1988 | Kabasin et al. | 180/197 |
| 4,771,849 | 9/1988 | Leiber et al. | 180/197 |
| 4,860,847 | 8/1989 | Shirashi et al. | 180/197 |

Primary Examiner—Charles A. Marmor
Assistant Examiner—Alan M. Kagen
Attorney, Agent, or Firm—Howard N. Conkey

[57] ABSTRACT

A vehicle acceleration wheel slip control system monitors wheel slip and when a wheel slip condition becomes excessive as wheel slip increases during vehicle acceleration, engine torque output is initially reduced in accord with the rate of change in wheel slip. This derivative adjustment produces a significant correction to the engine torque output before the slip condition becomes very large. Thereafter, when the slip condition represents recovery from the excessive slip condition, the engine torque output is controlled in accord with the error in wheel slip from a desired value. This proportional adjustment maintains a desired slip value while maintaining stable acceleration slip control.

7 Claims, 5 Drawing Sheets

VEHICLE TRACTION CONTROL SYSTEM

BACKGROUND OF THE INVENTION

This invention relates to a vehicle traction control system and, more particularly, to such a system which limits driven wheel torque input for limiting acceleration wheel slip.

It is a common experience with automotive vehicles for excessive wheel slip to occur during vehicle acceleration when the operator initiated engine torque delivered to the vehicle driven wheels are such that the frictional forces between the tire and the road surface are overcome. While a small amount of slip between the tire and road surface is necessary in order to achieve a driving force, excessive slip results in the reduction of effective driving force and in the deterioration in the lateral stability of the vehicle.

Various methods have been proposed for preventing an excessive slip condition of the driven wheels of a vehicle by limiting the slip between the wheel and the road surface at a value that will achieve a maximum transfer of driving force from the driven wheels to the road surface. For example, in one method, the output power of the engine is reduced by reducing the amount of fuel delivered to the engine when an excessive slip condition is detected.

Another method of limiting the acceleration slip of the driven wheels controls the throttle valve regulating the air intake of the engine to limit engine output torque to the driven wheels. In this form of system, it is typical to ramp the throttle closed in response to a sensed excessive slip condition and ramp the throttle open in response to a sensed recovery from the excessive slip condition.

In whichever form of controller employed, it is desirable to prevent large excursions of wheel slip which tend to reduce the driving force and lateral vehicle stability and to control wheel slip to a desired level to establish an optimum vehicle propulsion. It is further desirable to provide for such control that is stable under all vehicle accelerating conditions.

SUMMARY OF THE INVENTION

It is the general object of this invention to provide for an improved traction control system for limiting wheel acceleration slip by control of engine torque output.

In accord with a principal feature of this invention, when a wheel slip condition becomes excessive as wheel slip increases during vehicle acceleration, engine torque output is initially reduced in accord with the rate of change in wheel slip. This derivative adjustment produces a significant correction to the engine torque output before the slip condition becomes very large. Thereafter, when the slip condition represents recovery from the excessive slip condition, the engine torque output is controlled in accord with the error in wheel slip from a desired value. This proportional adjustment maintains a desired slip value while maintaining stable acceleration slip control.

In one aspect of the invention, the slip condition is represented by an index term having a value that is a function of the rate of change in slip and the magnitude of slip error.

In yet another aspect of the invention, the engine torque output is controlled by controlling the throttle position regulating air flow into the engine.

In a further aspect of the invention, derivative adjustment of the engine torque is again provided subsequent to a proportional adjustment only when the wheel slip exceeds the desired slip value by a predetermined amount so as to assure stable acceleration slip control.

DESCRIPTION OF THE DRAWINGS

The invention may be best understood by reference to the following description of a preferred embodiment and the drawings in which.

DESCRIPTION OF THE PREFERRED EMBODIMENT

Figure 1:
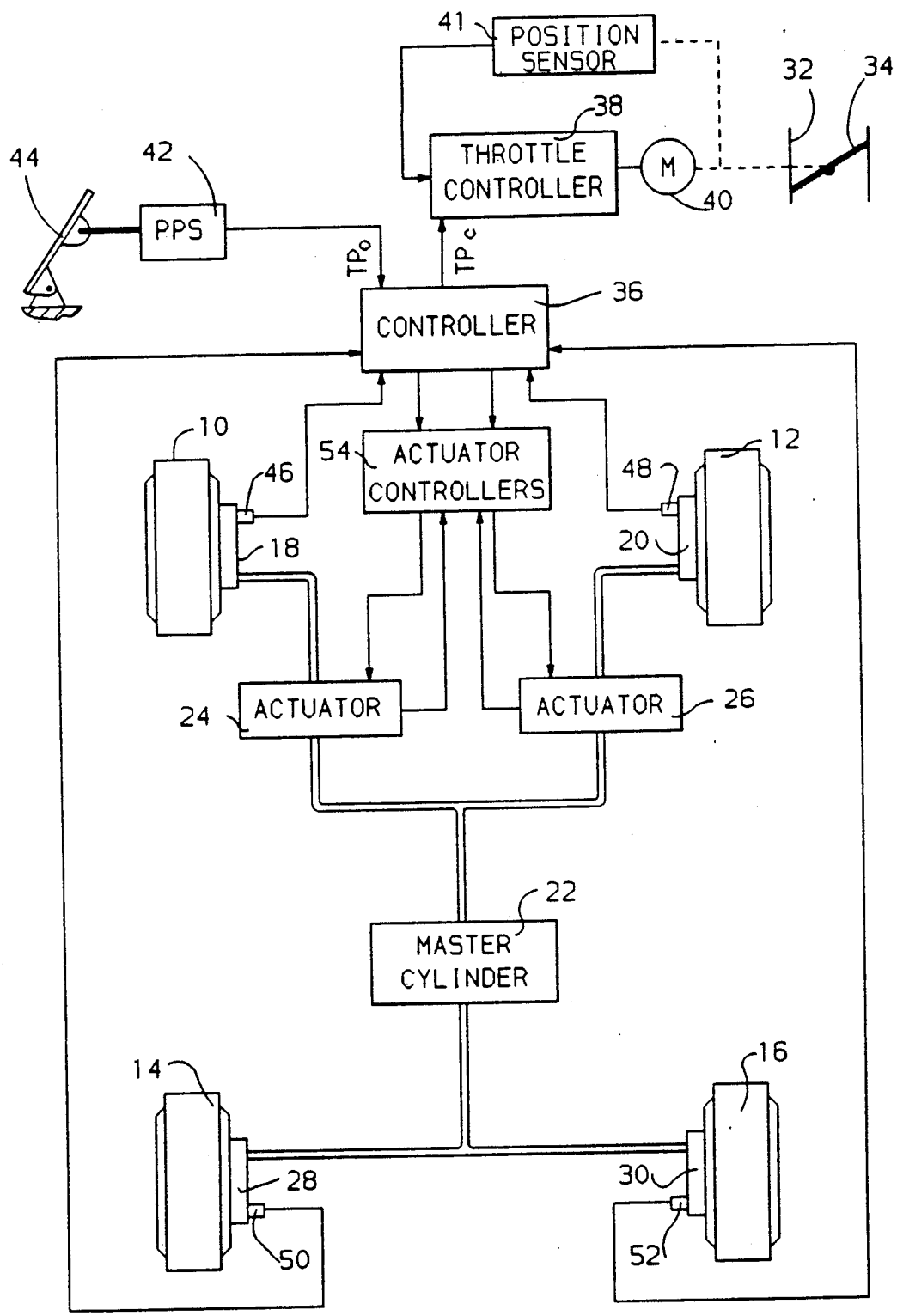
FIG. 1 is a schematic block diagram of a vehicle traction control system.

A traction control system for a front wheel drive vehicle is illustrated in FIG. 1. The vehicle has left and right front driven wheels 10 and 12 and left and right rear non-driven wheels 14 and 16. The front wheels 10 and 12 have respective hydraulic actuated brakes 18 and 20 actuated by manual operation of a conventional master cylinder 22 through a pair of traction control pressure actuators 24 and 26. When the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. Similarly, the rear wheels 14 and 16 include a pair of hydraulic actuated brakes 28 and 30 operated by hydraulic fluid under pressure from the master cylinder 22 in response to manual actuation of the brakes.

The vehicle includes an internal combustion engine, not shown, having an air intake passage 32 with a throttle valve 34 therein for regulating engine air intake and therefore engine operation as is well known.

The throttle valve 34 is controlled to a commanded throttle position $TP_c$ provided by a controller 36 to a throttle controller 38 which in turn provides closed loop control of the throttle valve 34 via a motor 40 and a conventional throttle position sensor 41, such as a potentiometer monitoring the actual position of the throttle valve 34 and providing a signal representing throttle position. The throttle controller 38 is standard in form and in one embodiment may include a digital-to-analog converter for generating an analog signal representing the commanded throttle position $TP_c$ which is compared with the output of the position sensor 41 to provide control to the motor 40 to position the throttle valve 34 at the commanded position.

During normal operation of the vehicle in the absence of a detected excessive slip condition of the driven wheels 10 and 12, the throttle valve 34 is controlled to an operator commanded position $TP_o$ provided by a pedal position sensor 42 monitoring the position of the standard accelerator pedal 44 operated by the vehicle operator.

If the engine is operated so as to deliver excessive torque to the driven wheels 10 and 12, they will experience excessive slip relative to the road surface thereby reducing the tractive force and the lateral stability of the vehicle. In order to limit the acceleration slip of the driven wheels 10 and 12 resulting from excessive engine output torque, the controller 36 limits slip by operating the brakes of the wheels 10 and 12 and by adjusting the commanded position $TP_c$ of the throttle valve 34 to limit the air intake through the intake passage 32. In another embodiment, only the throttle valve 34 is adjusted to limit acceleration wheel slip. To sense the slip condition of the driven wheels, the controller 36 monitors the wheel speeds of the left and right driven wheels 10 and 12 via speed sensors 46 and 48 and the wheel speeds of the left and right undriven wheels 14 and 16 via speed sensors 50 and 52.

If the controller 36 detects an excessive slip condition, the actuators 24 and 26 are operated via actuator controllers 54 for braking the left, right or both of the driven wheels 10 and 12 experiencing an excessive slipping condition to limit the slipping condition. The controller 36 further provides for controlling the engine torque output in response to an excessive slip condition of one or both of the driven wheels 10 and 12 by controlling the position of the throttle valve 34 via the throttle controller 38. In this regard, the controller 36 adjusts the operator commanded throttle position $TP_o$ and provides a commanded throttle position $TP_c$ for reducing or limiting the engine torque output for controlling acceleration slip. The control of the throttle valve 34 to control acceleration slip is independent of the control of the brakes of the driven wheels 10 and 12 and is provided in response to wheel slip.

Figure 2:
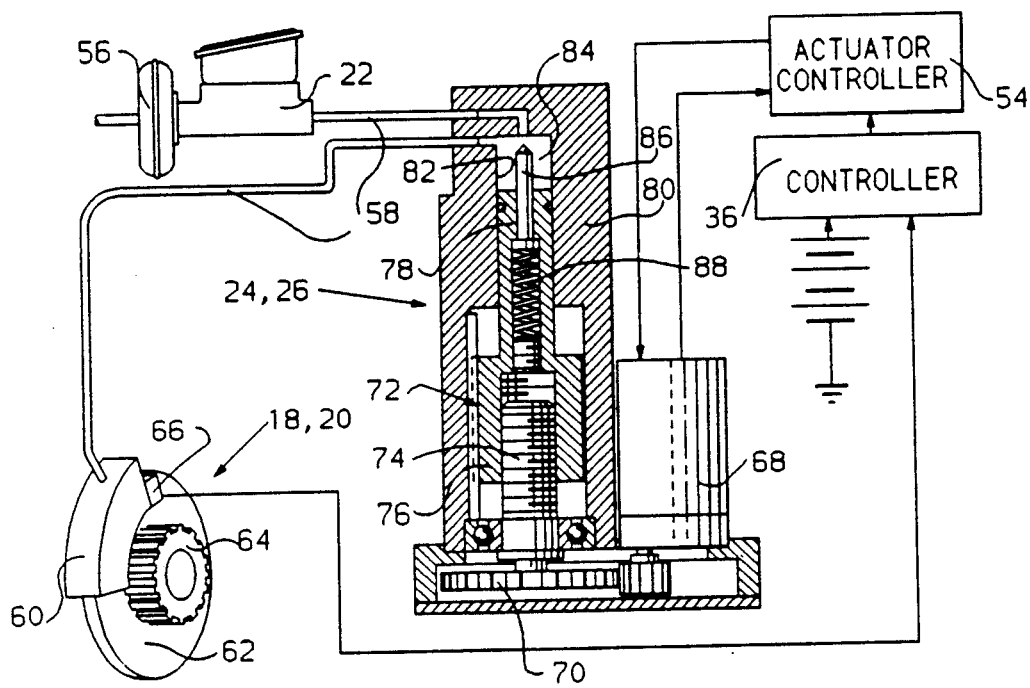
FIG. 2 is a view of the brake pressure modulator for controlling wheel brake pressure for limiting wheel slip.

Referring to FIG. 2, there is illustrated a braking system for one of the driven wheels 10 or 12 including the actuator 24, 26 controlled by the controller 36 for limiting slip of the driven wheel. In general, the braking system is composed of a hydraulic boost unit 56 and brake lines 58 providing fluid communication with the wheel brake 18,20. The wheel brake is illustrated as a disc brake system that includes a caliper 60 located at a rotor 62 of the vehicle wheel.

A wheel speed sensing assembly at each wheel is generally comprised of an exciter ring 64 which is rotated with the wheel and an electromagnetic sensor 66 which monitors the rotation of the exciter ring to provide a signal having a frequency proportional to wheel speed. The wheel speed signals are provided to the controller 36 to be used to determine the wheel speed.

The actuator 24,26 is illustrated in the inactive position wherein it is transparent to the braking system. This is the actuator condition during normal vehicle braking. Each actuator includes a DC torque motor 68 whose output shaft drives a gear train 70 whose output turns a ball screw actuator 72 comprised of a linear ball screw 74 and nut 76. As the linear ball screw rotates, the nut 76 is either extended or retracted thereby positioning a piston 78 which forms a part of the nut 76. Each actuator includes a housing 80 in which a cylinder 82 is formed. The piston 78 is reciprocally received in the cylinder 82 and defines therewith a chamber 84. The cylinder 82 has an inlet which is connected to the master cylinder 22 and an outlet which is coupled to the brake caliper 60 of the wheel brake.

A valve member 86 is carried by and extends from the end of the piston 78. This member is spring-biased within the piston 78 to an extended position as shown by a spring 88. When the piston 78 is in the retracted position illustrated, the fluid path between the master cylinder 22 and the wheel brake 18 is open. When, however, the ball screw 74 is rotated by the motor 68 to extend the nut 76 and therefore the piston 78, the valve member 86 is seated against the opening at the inlet to the chamber 84 from the master cylinder 22 to isolate the chamber 84 and the wheel brake 60 from the master cylinder 22. Once the valve 86 is seated, further extension of the piston 78 by rotation of the motor 68 then functions to pressurize the fluid at the brake 18 to apply braking forces to the wheel. The value of the current through the DC motor 68 is proportional to the wheel brake pressure and can be considered a measure thereof.

The ball screw actuator 72 is a high efficiency actuator so that the ball screw 74, gear train 70 and the motor output shaft are reverse driven by the hydraulic pressure acting on the piston 78 when it is greater than the torque output of the motor 68 until the hydraulic pressure is reduced to a level where it is overcome or offset by the torque output of the DC motor 68.

Figure 3:
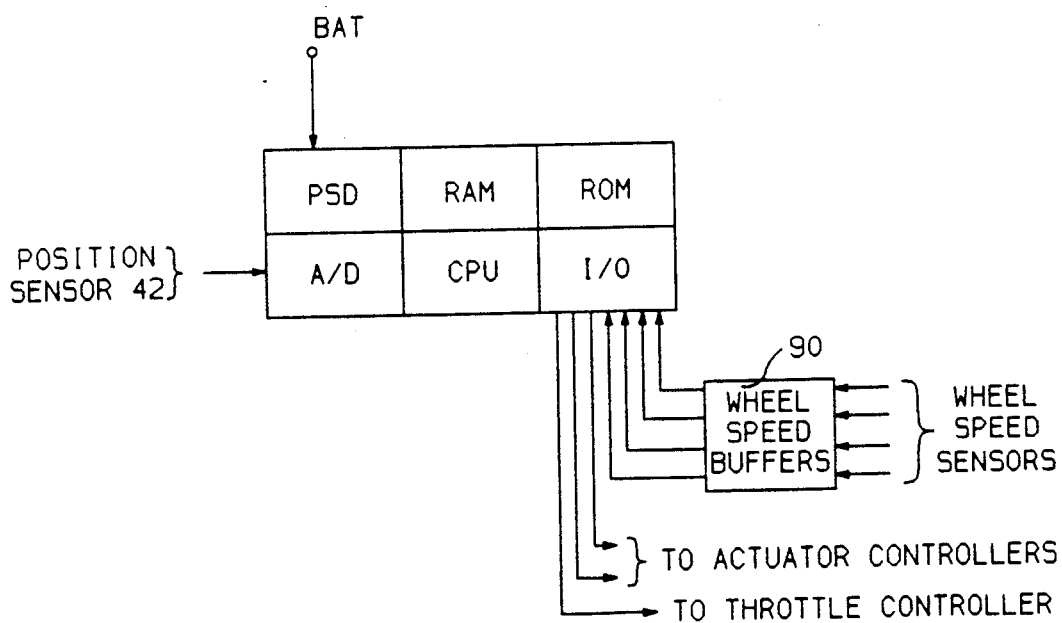
FIG. 3 is a diagram of the traction controller of FIG. 1 for controlling wheel brake pressure and for controlling the air flow into the intake of the vehicle engine for regulating engine torque output in accord with this invention.

The controller 36 of FIG. 1 takes the form of a conventional general purpose digital computer programmed to control the slip of the driven wheels 10 and 12 in accord with the principles of this invention. As illustrated in FIG. 3, the controller 36 consists of a common digital computer composed of a read-only memory (ROM), a random access memory (RAM), an analog-to-digital converter (A/D) that converts the analog output of the position sensor 42 to a digital signal, a power supply device (PSD), a central processing unit (CPU) and an input/output section (I/O), which interfaces to the actuator controllers 54, the throttle controller 38 and a wheel speed buffer circuit 90 which functions to condition the speed signal outputs of the wheel speed sensors.

The actuator controllers 54 take the form of two conventional independent closed loop motor current controllers, each of which establishes the current through the motor 68 of a respective one of the actuators 24 or 26 at a level commanded by the controller 36.

Figure 4:
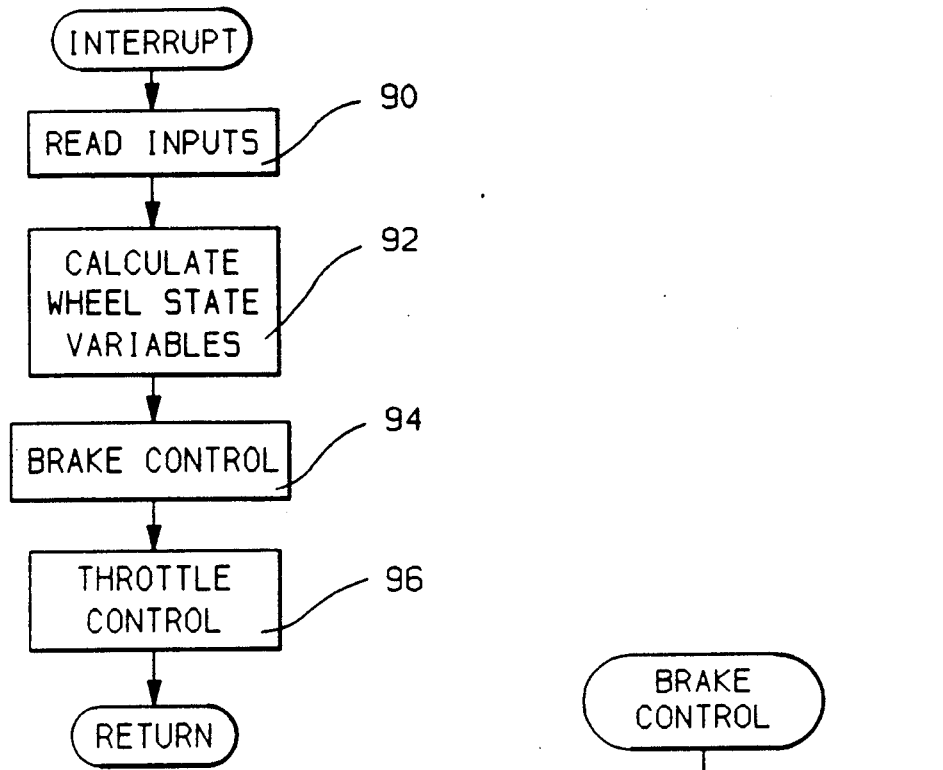
FIGS. 4–6 are flow diagrams illustrating the operation of the traction controller of FIG. 1.
Figure 5:
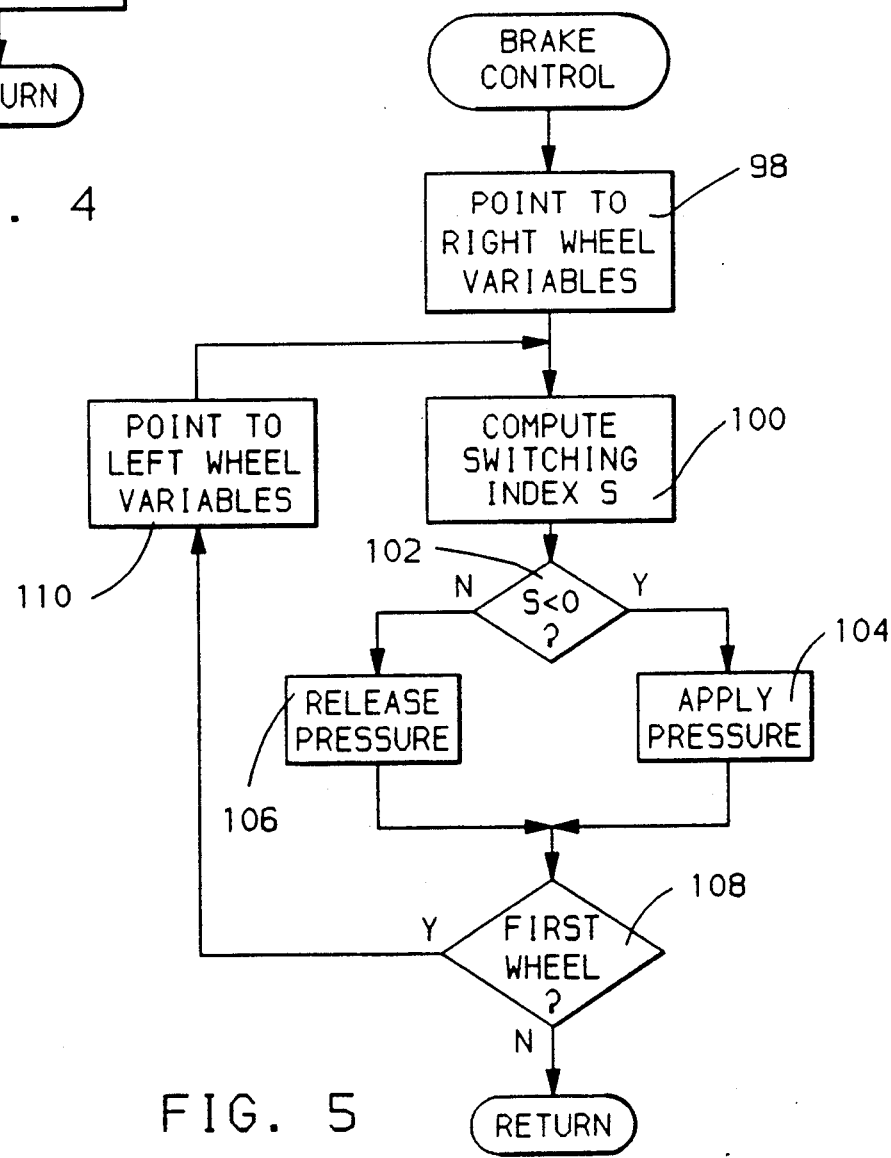
Figure 6A:
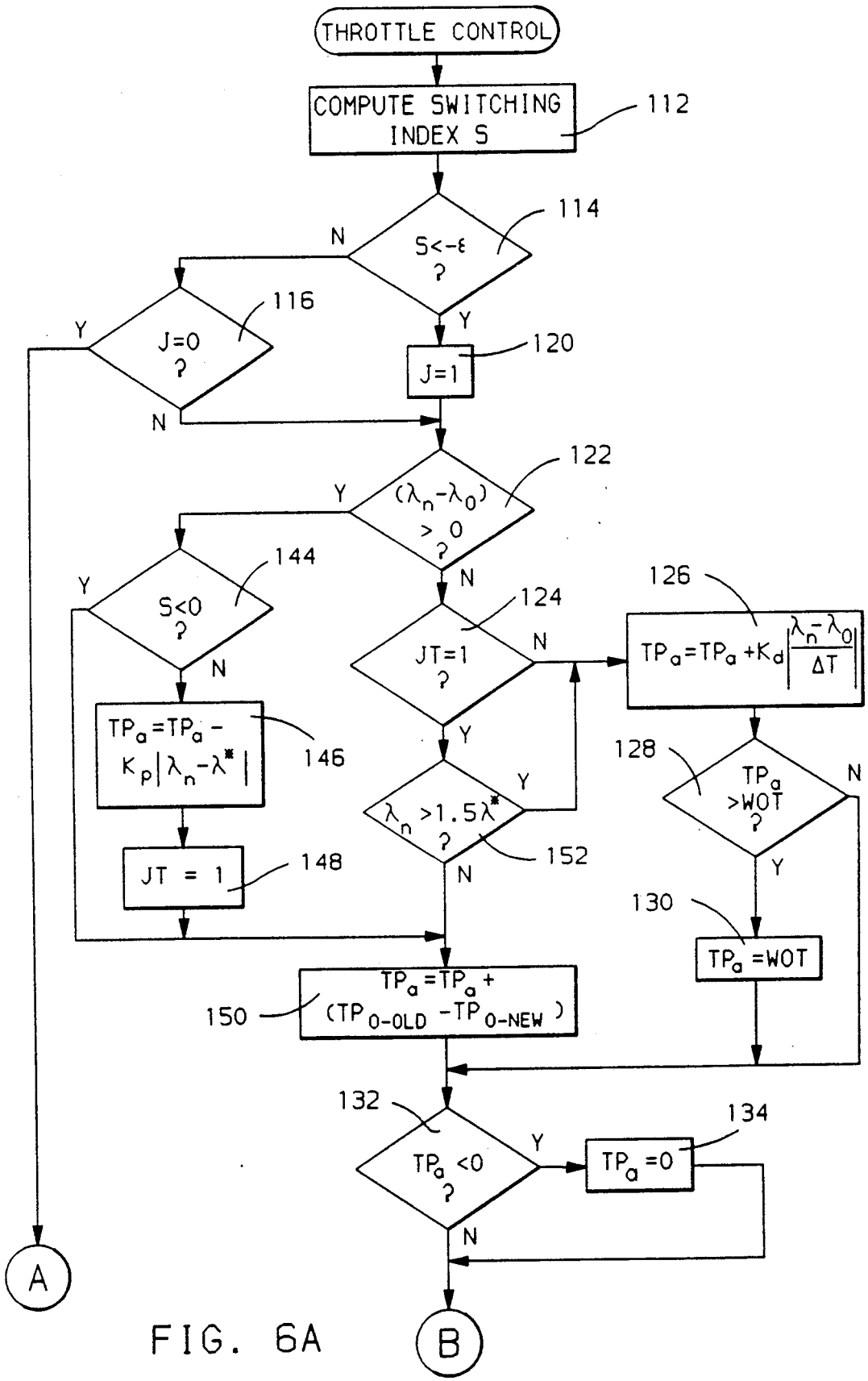
Figure 6B:
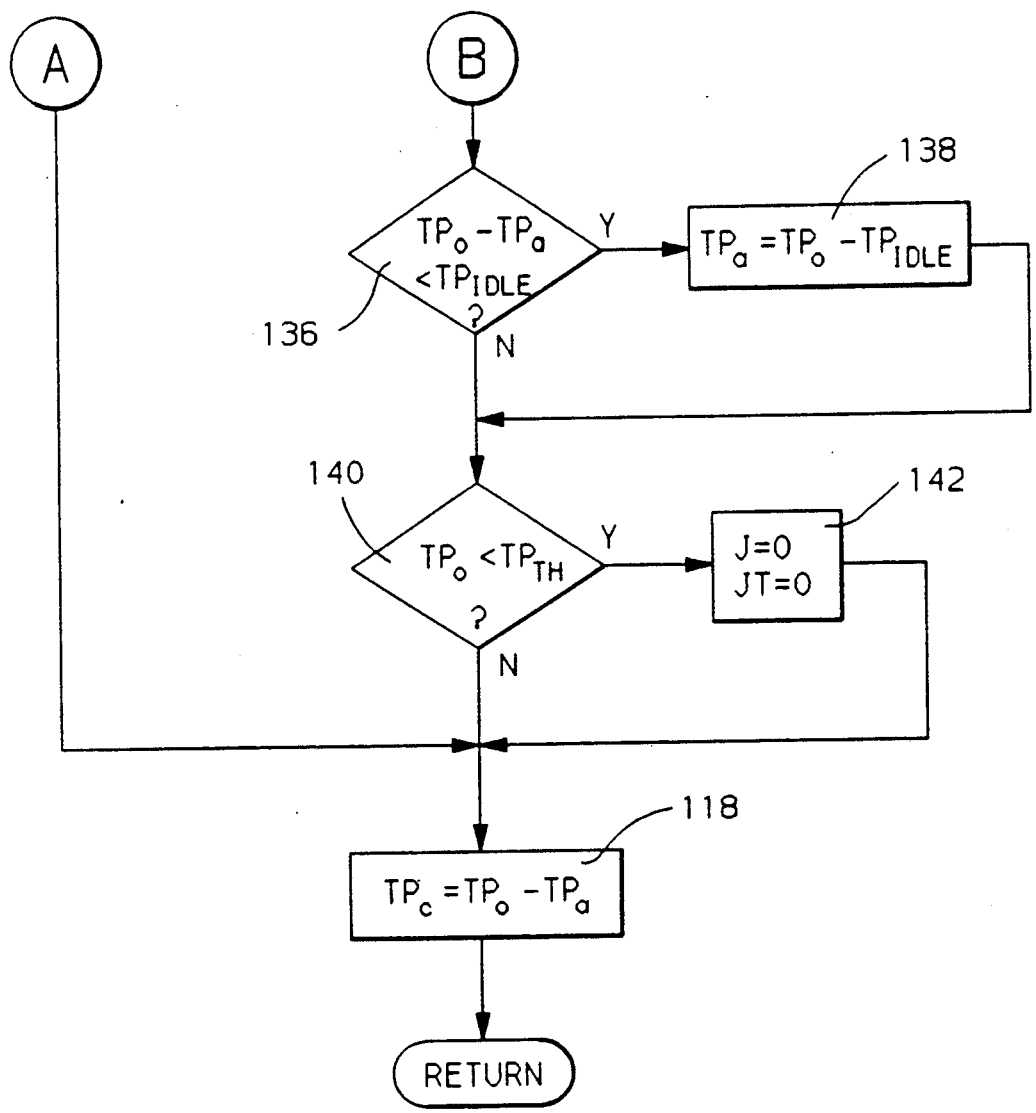

The ROM of the digital computer of FIG. 3 contains the instructions necessary to implement the control algorithm as diagrammed in FIGS. 4–6 in addition to calibration constants utilized in controlling acceleration slip. The flow diagram function blocks of FIGS. 4–6 describe the general task or process being executed by the controller 36 at that point. The specific programming of the ROM for carrying out the functions depicted in the flow diagrams of FIGS. 4–6 may be accomplished by standard skill in the art using conventional information processing languages.

While the digital computer of FIG. 3 may take any conventional form, one such form may be the single chip Motorola microcomputer MC-68HC11. Alternatively, multiple processors or other circuit forms may be employed. For example, a separate microcomputer may be employed to measure wheel speed and develop various wheel state variables.

Referring to FIG. 4, a control cycle interrupt routine for controlling the position of the throttle valve 34 in accord with operator demand and for limiting the acceleration slip of the driven wheels 10 and 12 is illustrated. This routine is executed by the controller 36 at constant interrupt intervals established by an internal timing circuit. For example, the interrupt routine of FIG. 4 may be executed at 10 millisecond intervals.

Upon receipt of a control cycle interrupt, the controller 36 reads the various system inputs at step 90 including the four wheel speeds and the operator commanded throttle position $TP_o$ provided by the pedal position sensor 42. From the measured values of wheel speed, various wheel state variables are computed at step 92. These wheel state variables include the slip of each of the driven wheels. In this embodiment, slip of each wheel is determined in accord with the expression $(\omega_v - \omega_d)/\omega_d$ where $\omega_d$ is the speed of the driven wheel and $\omega_v$ is the speed of the vehicle as represented by the speed of a hypothetically unbraked wheel. In one embodiment, $\omega_v$ may be represented by the speed of the undriven wheel on the same side of the vehicle as the wheel whose slip is being determined.

In another embodiment, $\omega_v$ may be the average of the speeds of the two undriven wheels 14 and 16. It should here be noted that the computed acceleration slip value is negative.

The interrupt routine then executes a brake control routine 94 which actuates the brake of a wheel experiencing excessive slip and then executes a throttle control routine 96 which controls the position of the throttle blade 34 in response to the operator actuation of the pedal 44 and controls the throttle position 34 for limiting acceleration slip in response to a detected excessive slip condition.

Referring to FIG. 5, the brake control routine 94 is illustrated. This routine provides for independent control of the pressure of each of the driven wheels 10 and 12 in response to its own slip condition. At the step 98, the routine points to the variables associated with one of the driven wheels 10 or 12 here illustrated as the right wheel. Thereafter at step 100, a switching index S for the selected wheel is computed. This switching index S represents a slip condition of the wheel and is utilized to determine whether or not an excessive slip condition exists. The index S is computed in accord with the expression > $S = C\Delta\lambda + \Delta\dot{\lambda}$ where C is a calibration constant (typically in a range from 0.03 to 0.075) or a variable in another embodiment and $\Delta\lambda$ is equal to the slip error $\lambda - \lambda^*$ where $\lambda$ is the slip of the selected wheel and $\lambda^*$ is a target or desired slip value. $\lambda^*$ generally is a slip value at which the wheel tractive force is a maximum and above which the tractive force decreases and wheel slip rapidly increases. From this expression it can be seen that the switching index representing the slip condition is a function of the slip error relative to a desired slip value and the rate of change in slip error. It can be seen that when the slip is not changing and is at the desired value, the switching index S will have a value equal to zero and the wheel tractive force is a maximum. However, when the switching index has a value less than zero (keeping in mind that slip is negative when the driven wheel speed exceeds the undriven wheel speed) an excessive slip condition is indicated. Conversely, when the value of the switching index S is greater than zero, a slip condition less than optimum is indicated.

In line with the foregoing, if at the next step 102 the value of the switching index S is determined to be less than zero, indicating an excessive slip condition, the program proceeds to a step 104 where the routine provides for increasing the pressure applied to the brake 20 of the right wheel 12. This is accomplished by incrementing the command current delivered to the actuator controller 54 for commanding an increase in the current to the actuator 26. The result is an incremental increase in the pressure applied to the wheel brake 20 of the right wheel 12. Conversely, if the value of the switching index S is greater than zero indicating the slip condition is less than optimum, the program proceeds to a step 106 where it provides for a release in the pressure applied to the wheel brake 20 of the right wheel 12. This is accomplished by decrementing the current command to the actuator controller associated with the actuator 26.

From steps 104 and 106, the program proceeds to a step 108 where it determines whether or not the brake control routine has been executed for each of the right and left driven wheels. If the routine has been executed only once in the present interrupt interval indicating that the routine has been executed only in reference to one of the two wheels, the program proceeds to a step 110 where the program is conditioned to execute the routine in reference to the other one of the two wheels. In this embodiment where the routine was first conditioned for the right wheel, step 110 points to the left wheel variables after which the steps 100–106 are executed in relation to the left wheel 10 using variables associated with the left wheel for controlling the left wheel brake 18 to maintain the slip thereof at the optimum level. Thereafter at step 108, the program exits the routine.

In the event that the wheel for which the brake control routine is conditioned is not experiencing an excessive slip condition as determined at step 102, the pressure will be released at step 106 with each execution of the interrupt routine of FIG. 4 until the command pressure is zero. Thereafter, the command is limited to zero and the pressure actuator is set in its transparent mode as illustrated in FIG. 2 to enable normal operation of the vehicle brakes by the vehicle operator.

Referring to FIG. 6, the throttle control routine 96 of FIG. 4 is illustrated. This routine provides for control of engine torque output based on wheel slip for acceleration slip control. The routine when entered proceeds to a step 112 where the value of a switching index S is computed for each wheel in identical manner as the computation at step 100 of FIG. 5 in relationship to the brake control routine and the switching index representing the greatest magnitude of acceleration wheel slip is selected. This then represents the slip condition of the driven wheel on the lowest coefficient of friction road surface. The same expression may be used in step 112 as in step 100 in which case step 112 simply recalls the one of the switching indexes computed at step 100 of FIG. 5 representing the greatest magnitude of acceleration slip. Thereafter, the parameters associated with the corresponding wheel will be used in the remainder portion of the throttle control routine.

The value of the switching index S established by step 112 is compared with a calibration constant threshold value $-\epsilon$ below which an excessive acceleration slip condition is indicated. Assuming first that the switching index S is not less than the threshold value $-\epsilon$, the state of a flag J is sampled at step 116. As will be described, this flag indicates whether or not an excessive slip condition as represented by the switching index had previously been experienced and engine torque is being regulated for acceleration slip control. Assuming that an excessive slip condition has not yet been experienced, the program proceeds to a step 118 where a throttle position command value $TP_c$ is generated for controlling the position of the throttle blade 30. This command is determined in accord with the expression > $TP_c = TP_o - TP_a$ where $TP_a$ is an adjustment to the operator commanded throttle position $TP_o$ for slip control. Since an excessive slip condition has not occurred, $TP_a$ is zero resulting in the throttle position command $TP_c$ being equal to the operator command $TP_o$. Accordingly, the position of the throttle blade 30 is controlled by the throttle controller 38 to the operator commanded position $TP_o$.

The foregoing steps are continually repeated with each execution of the interrupt routine of FIG. 4 to maintain the position of the throttle blade 34 equal to the operator commanded throttle position. However, if the computed switching index value becomes less than the threshold $-\epsilon$ indicating an excessive slip condition, the program proceeds to a step 120 where the flag J is set to indicate throttle control the routine is regulating engine torque output for acceleration slip control.

Generally, as the wheel slip exceeds the desired value $\lambda^*$ at which the tractive force is a maximum, the tractive force begins to decrease and wheel slip rapidly increases. In order to prevent large excursions in wheel slip, a rapid reduction in engine torque is required. This condition is sensed at step 122 which determines whether or not the magnitude of the slip is increasing. This is determined by comparing the difference $\lambda_n - \lambda_o$ with zero where $\lambda_n$ is the latest computation of wheel slip and $\lambda_o$ is the prior computation of wheel slip. If this difference is not greater than zero indicating the magnitude of slip is increasing (keeping in mind that $\lambda$ is negative when the driven wheels are slipping), the program proceeds to a step 124 where the state of a JT flag is sensed. This flag is normally in a reset state when an excessive slip condition is first sensed and is set when the excessive slip condition is first arrested. Assuming initially that the JT flag is at the normal initial reset condition, the program proceeds to a step 126 where a throttle position adjustment value $TP_a$ is determined in accord with the rate of change in wheel slip. This value is determined in accord with the expression $$TP_a = TP_a + K_d |(\lambda_n - \lambda_o)/\Delta t|$$

where $\Delta t$ is the interrupt interval of the interrupt routine of FIG. 4 and $K_d$ in one embodiment is a calibration constant typically between 1.5 and 0.3 and in another embodiment a variable as a function of a determined road surface coefficient of friction. The throttle angle adjustment value $TP_a$ is later utilized at step 118 to decrease the commanded throttle position $TP_c$ to reduce the engine torque in order to arrest the excessive slip condition. It can be seen that the expression derived at step 126 provides for a derivative adjustment of the commanded throttle position which provides for a significant correction to the engine torque before the magnitude of the slip condition becomes very large.

Returning to step 126, the throttle position adjustment value is next limited to a value equal to a wide open throttle amount. This is accomplished by comparing the throttle position adjustment $TP_a$ to a wide open throttle value WOT at step 128 and limiting the value to the wide open throttle value at step 130. Next the routine prevents the throttle position adjustment from increasing the operator commanded throttle position resulting in more engine torque output than requested by the vehicle operator This is accomplished by comparing $TP_a$ to zero at step 132 and if less than zero (having the effect of increasing the throttle position beyond the operator commanded position at step 118), the throttle angle adjustment is limited to zero at step 134.

To prevent the throttle position command $TP_c$ from establishing a throttle angle less than an idle position, the adjusted operator commanded position is limited to an idle throttle position $TP_{idle}$ by steps 136 and 138. If step 136 determines the adjustment would result in a throttle position less than the idle position $TP_{idle}$, the throttle angle adjustment $TP_a$ is limited at step 138 to the difference between the operator commanded throttle position $TP_o$ and the idle throttle position $TP_{idle}$.

The routine next provides for initializing the system in preparation for another sensed excessive slip condition whenever the operator commanded throttle position $TP_o$ is reduced to below a low threshold position $TP_{TH}$. This is accomplished by comparing the operator commanded angle $TP_o$ with the threshold value $TP_{TH}$. If the throttle angle is less than this threshold as determined at step 140, the flags J and JT are each reset at step 142 to condition the routine for again responding to an excessive acceleration slip condition.

Returning to step 114, once the J flag was set at step 120 when the excessive slip condition was first sensed, the program subsequently proceeds to step 122 even though the switching index S becomes greater than the threshold $-\epsilon$. As long as the magnitude of slip continues to increase as determined at step 122, the steps 124-130 are repeated with each execution of the throttle control routine as set forth above to continue to provide the derivative adjustment of step 126 to the throttle position to reduce engine torque output. When, as a result of the derivative adjustment initiated to arrest the excessive slip condition the magnitude of slip no longer is increasing as determined by step 122, the program proceeds from step 122 to a step 144 where the switching index value S is compared to a second threshold such as zero above which it is desired to increase engine torque to maintain the optimum slip value $\lambda^*$. This threshold may in other embodiments be equal to $+\epsilon$ or any other desired value. If the switching index value S is less than the threshold of step 144, the throttle position is maintained and the program proceeds to a step 150 to be described. When the switching index value becomes greater than the threshold level utilized at step 144 indicating the magnitude of the slip condition is less than desired, the program proceeds to a step 146 where the throttle angle adjustment is varied as a function of slip error in accord with the expression $$TP_a = TP_a - K_p |\lambda_n - \lambda^*|$$

where $K_p$ in one embodiment is a calibration constant typically between 0.5 and 2.5 and in another embodiment a variable as a predetermined function of a determined road surface coefficient of friction, vehicle speed and the transmission gear ratio. As can be seen, this provides for a proportional adjustment to the throttle angle adjustment value $TP_a$ in a direction to restore the wheel slip to the desired value. In general, when the magnitude of wheel slip decreases as vehicle speed increases after the increase in slip is rapidly halted by the aforementioned derivative control, the throttle position is not immediately adjusted as the switching index becomes greater than $-\epsilon$ as a result of the deadband defined by the respective thresholds of steps 114 and 144.

From step 146, the program next proceeds to a step 148 where the JT flag is set to indicate that the throttle angle is being increased in order to restore the slip condition to the optimum condition whereat the switching index S is equal to zero. As will be described, the function of this JT flag is to prevent a subsequent derivative adjustment of the throttle angle adjustment value $TP_a$ when the slip begins to increase in response to the increased throttle angle resulting from the step 146.

Step 150 accounts for the fact that the vehicle operator may have made an adjustment to the position of the pedal 44 resulting in a change in the operator commanded throttle position $TP_o$. The step 150 corrects the throttle angle adjustment by the amount already made by the operator. This is accomplished by adjusting the throttle angle adjustment value $TP_a$ by the difference between the operator commanded throttle angle position $TP_{o\text{-}old}$ determined at the prior execution of the throttle control routine and the present operator commanded value $TP_{o\text{-}new}$.

From step 150, the limitations established via steps 132–138 are imposed as previously described on the throttle angle adjustment value after which the commanded throttle position $TP_c$ is determined at step 118 and provided to the throttle controller 38.

If as a result of one or more executions of the step 146 during repeated executions of the interrupt routine of FIG. 4 the magnitude of wheel slip should again increase as sensed at step 122, the program proceeds to the step 124 where the condition of the JT flag is sensed. If set, it indicates that the wheel slip increase has been arrested after the slip first exceeded the threshold value $-\epsilon$ and a proportional adjustment to increase the throttle angle has been made at step 146 to restore slip to the desired value $\lambda^*$. In order to prevent possible control oscillations, it is not desirable to then make an immediate derivative adjustment to the throttle angle in the opposite direction to reduce the throttle angle. If allowed to happen, a potential oscillatory condition may result in the control of the throttle angle. Accordingly, the program proceeds from step 124 to a step 152 where the wheel slip value $\lambda_n$ is compared with some value greater than the desired slip value $\lambda^*$ such as 1.5 $\lambda^*$.

If the slip is within a predetermined range of the desired slip (in this embodiment 1.5 $\lambda^*$), the program proceeds directly from step 152 to step 150 after which the program proceeds as previously described. However, if the last determined slip value $\lambda_n$ is less than 1.5 $\lambda^*$ (representing a slip that is 1.5 times larger than the desired slip value), the program proceeds to provide a derivative adjustment to the throttle angle via execution of the step 126 as previously described.

The foregoing steps are repeatedly executed to maintain the switching index in a range between zero and $-\epsilon$ established at steps 114 and 144. If at any time step 140 determines that the throttle position predetermined constant calibration threshold $TP_{TH}$, the system is initialized to the initial state at step 142 such that the program proceeds from step 114 to 116 and then to 118 to provide throttle position control in accord with the operator commanded value as previously described.

The foregoing description of a preferred embodiment of the invention for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. A traction control method for a vehicle having an engine for applying a driving torque to a driven wheel, the system comprising the steps of:
   measuring driven wheel speed;
   determining vehicle speed;
   determining the magnitude of wheel slip from the measured wheel speed and the determined vehicle speed;
   reducing the driving torque applied to the driven wheel by the engine at a rate proportional to the rate of change in the determined magnitude of wheel slip when (A) the determined magnitude of wheel slip represents an excessive acceleration wheel slip condition and (B) the wheel slip is increasing; and
   controlling the driving torque applied to the driven wheel by the engine in accord with the difference between the determined wheel slip and a desired wheel slip subsequent to the step of reducing the driving torque when the determined magnitude of wheel slip is decreasing.

2. A traction control method for a vehicle having an engine applying a driving torque to a driven wheel, the engine having an air intake system including a throttle bore and a throttle blade rotatable therein to selected positions for regulating the driving torque applied to the driven wheel, the method comprising the steps of:
   measuring driven wheel speed;
   determining vehicle speed;
   determining the magnitude of wheel slip from the measured wheel speed and the determined vehicle speed;
   reducing the position of the throttle blade at a rate proportional to the rate of change in the determined magnitude of wheel slip when (A) the determined magnitude of wheel slip represents an excessive acceleration wheel slip condition and (B) the magnitude of wheel slip is increasing; and
   controlling the position of the throttle blade in accord with the difference between the determined wheel slip and a desired wheel slip when the determined magnitude of wheel slip subsequent to the step of reducing the position of the throttle blade is decreasing.

3. A traction control method for a vehicle having an engine applying a driving torque to a driven wheel, the engine having an air intake system including a throttle bore and a throttle blade rotatable therein to selected positions for regulating the driving torque applied to the driven wheel, the method comprising the steps of:
   measuring driven wheel speed $\omega_d$;
   determining vehicle speed $\omega_v$;
   determining the magnitude of wheel slip $\lambda$ from the measured wheel speed and the determined vehicle speed in accord with the expression $\lambda = (\omega_v - \omega_d)/\omega_d$;
   determining a switching index value S in accord with the expression $S = C\Delta\lambda + \Delta\lambda$, where C is a constant and $\Delta\lambda$ is slip error equal to $\lambda - \lambda^*$ where $\lambda^*$ is a desired wheel slip value;
   reducing the position of the throttle blade at a rate proportional to the wheel slip rate of change when (A) the determined switching index value S is less than a first predetermined threshold and (B) the magnitude of wheel slip is increasing; and
   controlling the position of the throttle blade in accord with the slip error $\Delta\lambda$ when the determined magnitude of wheel slip subsequent to the step of reducing the position of the throttle blade is decreasing.

4. The traction control method of claim 3 further including a step of reducing the position of the throttle blade at a rate proportional to the wheel slip rate of change subsequent to the step of controlling the position in accord with slip error when the magnitude of wheel slip is again increasing and $\lambda$ is greater than $K\lambda^*$ where K is a constant greater than unity.

5. A traction control method for a vehicle having an engine applying a driving torque to a driven wheel, the engine having an air intake system including a throttle bore and a throttle blade rotatable therein to selected positions for regulating the driving torque applied to the driven wheel, the method comprising the steps of:

measuring driven wheel speed;

determining vehicle speed;

determining the magnitude of wheel slip $\lambda$ from the measured wheel speed and the determined vehicle speed;

sensing an initial onset of excessive wheel slip represented by (A) a predetermined excessive slip condition represented at least in part on the difference $\lambda - \lambda^*$, where $\lambda^*$ is a desired peak slip value and $\lambda - \lambda^*$ is slip error and (B) an increasing determined magnitude of wheel slip $\lambda$;

sensing an excessive wheel slip recovery condition that includes a decreasing magnitude of wheel slip $\lambda^*$;

sensing subsequent onsets of excessive wheel slip represented by (A) an increasing determined magnitude of wheel slip $\lambda$ and (B) wheel slip $\lambda$ being greater than $K\lambda^*$, where K is a predetermined constant greater than unity;

reducing the position of the throttle blade at a rate proportional to the rate of change of the determined wheel slip $\lambda$ when either an initial or subsequent onsets of excessive wheel slip are sensed; and controlling the position of the throttle blade in accord with the slip error $\lambda - \lambda^*$ when an excessive wheel slip recovery condition is sensed.

6. The method of claim 5 further including the step of limiting the controlled position of the throttle blade to a maximum equal to an operator established position.

7. A traction control method for a vehicle having an engine applying a driving torque to a driven wheel, the system comprising the steps of:

measuring driven wheel speed;

determining vehicle speed;

determining the magnitude of wheel slip from the measured wheel speed and the determined vehicle speed;

sensing an initial onset of excessive wheel slip represented by (A) a predetermined excessive slip condition and (B) an increasing determined magnitude of wheel slip;

sensing an excessive wheel slip recovery condition that includes a decreasing determined magnitude of wheel slip;

sensing subsequent onsets of excessive wheel slip represented by (A) an increasing determined magnitude of wheel slip and (B) wheel slip being greater than $K\lambda^*$, where K is a predetermined constant greater than unity and $\lambda^*$ is a desired peak slip value;

reducing the driving torque applied to the driven wheel by the engine at a rate proportional to the rate of change of the determined wheel slip when either an initial or subsequent onsets of excessive wheel slip are sensed; and controlling the driving torque applied to the driven wheel by the engine in accord with the difference between the determined wheel slip and the desired peak slip value $\lambda^*$ subsequent to the step of reducing the driving torque when the determined magnitude of wheel slip is decreasing.

* * * * *